US012775193B2

(12) United States Patent
Shimizu et al.

(10) Patent No.: US 12,775,193 B2
(45) Date of Patent: Oct. 27, 2026

(54) OPTICAL AMPLIFICATION APPARATUS AND OPTICAL AMPLIFICATION METHOD

(71) Applicant: NTT, Inc., Tokyo (JP)

(72) Inventors: Shimpei Shimizu, Musashino (JP); Takushi Kazama, Musashino (JP); Takayuki Kobayashi, Musashino (JP); Yutaka Miyamoto, Musashino (JP); Takeshi Umeki, Musashino (JP)

(73) Assignee: NTT, Inc., Tokyo (JP)

( * ) Notice: Subject to any disclaimer, the term of this patent is extended or adjusted under 35 U.S.C. 154(b) by 429 days.

(21) Appl. No.: 18/289,389

(22) PCT Filed: May 20, 2021

(86) PCT No.: PCT/JP2021/019111
§ 371 (c)(1),
(2) Date: Nov. 3, 2023

(87) PCT Pub. No.: WO2022/244171
PCT Pub. Date: Nov. 24, 2022

(65) Prior Publication Data

US 2024/0248369 A1 Jul. 25, 2024

(51) Int. Cl.
*G02F 1/35* (2006.01)
*G02F 1/39* (2006.01)
(Continued)

(52) U.S. Cl.
CPC ............ *G02F 1/392* (2021.01); *G02F 1/3546* (2021.01); *H04B 10/07955* (2013.01); *H04B 10/2942* (2013.01); *H04B 10/6166* (2013.01)

(58) Field of Classification Search
CPC . G02F 1/392; G02F 1/3546; H04B 10/07955; H04B 10/2942; H04B 10/6166
See application file for complete search history.

(56) References Cited

U.S. PATENT DOCUMENTS

| | | | |
|---|---|---|---|
| 2011/0044684 | A1 | 2/2011 | Watanabe |
| 2018/0231870 | A1 | 8/2018 | Takasaka |

(Continued)

FOREIGN PATENT DOCUMENTS

| | | | |
|---|---|---|---|
| EP | 1633066 A2 | 3/2006 | |
| EP | 3364244 A1 | 8/2018 | |

(Continued)

OTHER PUBLICATIONS

J. Renaudier et al., "First 100-nm Continuous-Band WDM Transmission System with 115Tb/s Transport over 100km Using Novel Ultra-Wideband Semiconductor Optical Amplifiers", Proceedings of the European Conference on Optical Communication (ECOC), paper Th.PDP.A.2, Sep. 2017.

(Continued)

*Primary Examiner* — Dennis P Joseph
(74) *Attorney, Agent, or Firm* — Harness, Dickey & Pierce, P.L.C.

(57) ABSTRACT

An optical amplification device includes: a polarization demultiplexing unit that separates an optical signal into a first polarized wave and a second polarized wave; a first optical amplification unit that amplifies the first polarized wave by using a first amplification medium; a second optical amplification unit that amplifies the second polarized wave by using a second amplification medium; a first band demultiplexing unit that demultiplexes the first polarized wave into a band component of the first polarized wave and a band component of first phase conjugate light; a second band demultiplexing unit that demultiplexes the second polarized wave into a band component of the second polarized wave and a band component of second phase conjugate light; a signal monitoring unit that measures a first optical power value of either the band component of the first polarized wave or the band component of the first phase conjugate (Continued)

light and a second optical power value of either the band component of the second polarized wave or the band component of the second phase conjugate light; an amplification gain control unit that controls an amplification band and gain of the first amplification medium and an amplification band and gain of the second amplification medium on the basis of the first optical power value and the second optical power value; and a polarization combination unit that multiplexes the band component of the first polarized wave and the band component of the second polarized wave not measured by the signal monitoring unit.

7 Claims, 5 Drawing Sheets

(51) Int. Cl.

| | |
|---|---|
| ***H04B 10/079*** | (2013.01) |
| ***H04B 10/294*** | (2013.01) |
| ***H04B 10/61*** | (2013.01) |

(56) References Cited

U.S. PATENT DOCUMENTS

| | | | | |
|---|---|---|---|---|
| 2021/0405502 | A1 | 12/2021 | Umeki et al. | |
| 2022/0004081 | A1 | 1/2022 | Embutsu et al. | |
| 2022/0045764 | A1* | 2/2022 | Nasu | H04J 14/06 |
| 2022/0236483 | A1* | 7/2022 | Sugama | G02B 6/12007 |

FOREIGN PATENT DOCUMENTS

| | | | |
|---|---|---|---|
| JP | H06-082863 | A | 3/1994 |
| JP | 2006-184851 | A | 7/2006 |
| JP | 2017-076008 | A | 4/2017 |
| JP | 2020-076834 | A | 5/2020 |
| JP | 2020-086031 | A | 6/2020 |

OTHER PUBLICATIONS

T. Kobayashi et al., "Wide-band Inline-Amplified WDM Transmission Using PPLN-Based Optical Parametric Amplifier", Journal of Lightwave Technology, vol. 39, No. 3, IEEE, pp. 787-794, Feb. 2021.

T. Umeki et al., "Simultaneous nonlinearity mitigation in 92×180-Gbit/s PDM-16QAM transmission over 3840 km using PPLN-based guard-band-less optical phase conjugation", Optics Express, vol. 24, No. 15, pp. 16945-16951, Jul. 2016.

* cited by examiner

OPTICAL AMPLIFICATION APPARATUS AND OPTICAL AMPLIFICATION METHOD

CROSS-REFERENCE TO RELATED APPLICATIONS

This application is a 371 U.S. National Phase of International Application No. PCT/JP2021/019111, filed on May 20, 2021. The entire disclosure of the above application is incorporated herein by reference.

TECHNICAL FIELD

The present invention relates to an optical amplification apparatus and an optical amplification method.

BACKGROUND ART

In long-distance optical fiber transmission, an optical amplification relay transmission method is used to amplify an optical signal by using optical amplifiers provided at regular intervals. Each optical amplifier compensates for an optical loss caused when the optical signal propagates through an optical fiber. Therefore, a transmission band of the optical fiber transmission system is limited by an amplification band of the optical amplifier. One of general optical amplifiers is a rare-earth-doped optical amplifier in which a rare-earth element is added to an optical fiber. An erbium-doped fiber amplifier (EDFA), which is a typical rare-earth-doped optical amplifier, has an amplification band of about 4 [THz] in the C-band (about 1530 to 15651 nm). This band is a wavelength band generally used in long-distance optical fiber transmission.

As a method of avoiding the above-described limitation of the transmission band caused by the amplification band of the optical amplifier and achieving broadband optical amplification, there is a method of arranging different types of amplifiers in parallel to expand the transmission band. The different types of amplifiers herein are, for example, optical amplifiers whose amplification bands are shifted by adding different rare-earth elements to an optical fiber. However, this method has the following problem: a gain is low and a noise figure is high in bands other than the C-band. Further, in order to prevent an increase in device cost, operating cost, and the like of the optical fiber transmission system, a single type of optical amplifier is desirably used.

Another optical amplifier that achieves broadband optical amplification is a semiconductor optical amplifier (SOA). The SOA is demonstrated to achieve an amplification band of 12 [THz] or more (see Non Patent Literature 1). However, it is reported that signal distortion occurs in the SOA due to an increase or decrease in input power of a signal. In a case of application to an optical network in consideration of, for example, add/drop of a wavelength channel, it is not desirable that the optical amplifier have such a characteristic that signal distortion occurs due to an increase or decrease in input power of a signal.

Therefore, an optical parametric amplifier (OPA) has attracted attention in recent years. The OPA is an optical amplifier that amplifies input light by allowing light beams having different wavelengths to interact with each other by using a nonlinear optical effect in a nonlinear optical medium such as lithium niobate that is a second-order nonlinear optical medium or an optical fiber that is a third-order nonlinear optical medium. In order to achieve both a broadband characteristic and a high gain, a configuration having periodically poled lithium niobate (PPLN) as an amplification medium is particularly promising. An OPA having PPLN as the amplification medium is demonstrated to achieve broadband relay amplification transmission exceeding 10 [THz] with an amplification gain of 15 [dB] (see Non Patent Literature 2). Further, an optical parametric amplification process has an extremely high reaction rate. Therefore, the OPA can achieve a highly robust optical amplification characteristic even with respect to an increase or decrease in input power of a signal.

In the second-order nonlinear optical medium such as PPLN, the nonlinear optical effect is exhibited only for a polarization state in a specific direction. Therefore, it is necessary to provide a polarization diversity configuration that polarizes and separates an optical signal by using a polarization beam splitter or the like before amplifying the optical signal and multiplexes the optical signal after amplifying the optical signal. Further, a gain based on a polarization state of excitation light is generated even in the third-order nonlinear optical medium. Therefore, in order to prevent a polarization differential gain (PDG), it is desirable to use the above polarization diversity configuration.

In the OPA, idler light serving as phase conjugate light of an optical signal is generated as a secondary effect generated when the input optical signal is amplified. For signal transmission, it is only necessary to transmit an optical component of either the original optical signal or the idler light. The optical component not used for signal transmission is cut by a wavelength filter.

In a case where the idler light is used for signal transmission, the OPA functions as an optical phase conjugator (OPC) and can compensate for optical noise in a phase direction such as nonlinear phase distortion (see Non Patent Literature 3). Even in a case where a compensation effect of the nonlinear phase distortion or the like is not used, the OPA can be used as a wavelength converter (see Patent Literature 1). By using phase conjugate light as a new transmission optical signal, it is possible to offset noise in the phase direction, such as nonlinear phase distortion generated in transmission so far, with noise generated in transmission after phase conjugation.

CITATION LIST

Patent Literature

Patent Literature 1: JP 2020-086031 A
Patent Literature 2: JP 2020-076834 A

Non Patent Literature

Non Patent Literature 1: J. Renaudier et al., "First 100-nm Continuous-Band WDM Transmission System with 115 Tb/s Transport over 100 km Using Novel Ultra-Wideband Semiconductor Optical Amplifiers", proceedings of the European Conference on Optical Communication (ECOC), paper Th.PDPA.2, September 2017.

Non Patent Literature 2: T. Kobayashi et al., "Wide-band Inline-Amplified WDM Transmission Using PPLN-Based Optical Parametric Amplifier", Journal of Lightwave Technology, Vol. 39, No. 3, IEEE, pp. 787-794, February 2021.

Non Patent Literature 3: T. Umeki et al., "Simultaneous nonlinearity mitigation in 92×180-Gbit/s PDM-16QAM transmission over 3840 km using PPLN-based guard-band-less optical phase conjugation", Optics Express, Vol. 24, No. 15, pp. 16945-16951, July 2016.

SUMMARY OF INVENTION

Technical Problem

Idler light is generated at a frequency symmetric to that of an optical signal with respect to a fundamental frequency that is a center frequency of a phase matching characteristic of an amplification medium. Therefore, at the time of amplification in the OPA, it is necessary to leave a band for generating idler light, and thus an optical signal cannot be arranged in the band. Accordingly, in order to maximally use the amplification band of the OPA, it is necessary to provide a configuration that divides an optical signal into two bands with respect to the fundamental frequency, amplifies the optical signals by using respective different nonlinear media, cuts an unnecessary optical component by using a wavelength filter, and then multiplexes the optical signals. The unnecessary optical component herein is an optical component of either the original optical signal or the idler light that is not used for signal transmission as described above.

The amplification band of the nonlinear optical medium is determined based on the phase matching characteristic of the medium, and the phase matching characteristic can be changed by, for example, adjusting a temperature of the medium. Changing the phase matching characteristic changes a gain spectrum of the OPA. Specifically, the gain near the center frequency decreases, and a peak of the gain changes from the center frequency to an outer frequency. Therefore, it is possible to broaden the amplification band at the expense of flatness of the gain spectrum. As described above, the OPA can change the phase matching characteristic by adjusting the temperature of the amplification medium and can broaden the amplification band. Further, the optical amplification characteristic fluctuates sensitively to a change in temperature, and thus it is desirable to constantly monitor a state of the OPA.

In a case of the polarization diversity configuration, different amplification media are used for both polarized waves. Therefore, a PDG occurs when gains are different from each other due to individual differences in the phase matching characteristic, a temperature characteristic, excitation efficiency, and the like between the amplification media and power of excitation light. Such a PDG leads to deterioration of signal quality. Further, because the OPA divides an optical signal into two bands to amplify the optical signal, a band differential gain (BDG) may also occur due to the above factors as in the PDG. The BDG does not directly degrade signal quality and can be compensated for by gain equalization after amplification. However, a value of the BDG needs to be suppressed to such an extent that the value falls within a control range of a gain equalizer.

Therefore, a method of monitoring and controlling an amplification state of each amplification medium is required for stable operation of the OPA. A method of tapping part of signal power of amplified light is generally used as a method of monitoring the signal power. However, such a method has the following problems: signal power of a main signal line may decrease; and a measurement error may occur due to weakness of monitor light.

In view of the above circumstances, an object of the present invention is to provide an optical amplification device and an optical amplification method capable of monitoring signal power of amplified light while preventing a decrease in signal power of a main signal line and occurrence of a measurement error caused by weakness of monitor light.

Solution to Problem

One aspect of the present invention is an optical amplification device including: a polarization demultiplexing unit that separates an optical signal into a first polarized wave and a second polarized wave orthogonal to each other; a first optical amplification unit that amplifies the first polarized wave by using a first amplification medium; a second optical amplification unit that amplifies the second polarized wave by using a second amplification medium; a first band demultiplexing unit that demultiplexes the amplified first polarized wave into a band component of the first polarized wave and a band component of first phase conjugate light generated by the amplification; a second band demultiplexing unit that demultiplexes the amplified second polarized wave into a band component of the second polarized wave and a band component of second phase conjugate light generated by the amplification; a signal monitoring unit that measures a first optical power value of optical power of either the band component of the first polarized wave or the band component of the first phase conjugate light and a second optical power value of optical power of either the band component of the second polarized wave or the band component of the second phase conjugate light; an amplification gain control unit that controls an amplification band and gain of the first amplification medium and an amplification band and gain of the second amplification medium on the basis of the first optical power value and the second optical power value; and a polarization combination unit that multiplexes the band component of the first polarized wave not measured by the signal monitoring unit and the band component of the second polarized wave not measured by the signal monitoring unit.

One aspect of the present invention is an optical amplification method including: a polarization demultiplexing step of separating an optical signal into a first polarized wave and a second polarized wave orthogonal to each other; a first optical amplification step of amplifying the first polarized wave by using a first amplification medium; a second optical amplification step of amplifying the second polarized wave by using a second amplification medium; a first band demultiplexing step of demultiplexing the amplified first polarized wave into a band component of the first polarized wave and a band component of first phase conjugate light generated by the amplification; a second band demultiplexing step of demultiplexing the amplified second polarized wave into a band component of the second polarized wave and a band component of second phase conjugate light generated by the amplification; a signal monitoring step of measuring a first optical power value of optical power of either the band component of the first polarized wave or the band component of the first phase conjugate light and a second optical power value of optical power of either the band component of the second polarized wave or the band component of the second phase conjugate light; an amplification gain control step of controlling an amplification band and gain of the first amplification medium and an amplification band and gain of the second amplification medium on the basis of the first optical power value and the second optical power value; and a polarization multiplexing step of multiplexing the band component of the first polarized wave not measured in the signal monitoring step and the band component of the second polarized wave not measured in the signal monitoring step.

Advantageous Effects of Invention

The present invention can monitor signal power of amplified light while preventing a decrease in signal power of a main signal line and occurrence of a measurement error caused by weakness of monitor light.

DESCRIPTION OF EMBODIMENTS

Hereinafter, embodiments of the present invention will be described in detail with reference to the drawings.

In an optical parametric amplifier (hereinafter, referred to as "OPA"), idler light serving as phase conjugate light of an optical signal is generated as a secondary effect generated when the input optical signal is amplified. For signal transmission, it is only necessary to transmit an optical component of either the original optical signal or the idler light. Conventionally, the optical component not used for signal transmission is cut by a wavelength filter, and thus an optical fiber for signal transmission is not excited.

Meanwhile, the optical signal and the idler light are complete copies of each other, except that the optical signal and the idler light have a phase conjugate relationship. Therefore, a state of the transmitted optical signal can be indirectly monitored by acquiring and monitoring the optical component that has been cut in the related art. A method of monitoring idler light and controlling a shape of an amplification band has been conventionally disclosed (see Patent Literature 2).

An optical amplification device (an optical amplification apparatus) according to embodiments described below performs control so as to match characteristics of a plurality of nonlinear media. The optical amplification device according to the embodiments monitors the optical component not used in the conventional signal transmission and controls a temperature of an amplification medium, optical power of excitation light, and an optical path length of each polarized wave by using the monitoring value. Therefore, the optical amplification device according to the embodiments minimizes a polarization differential gain (hereinafter, referred to as "PDG") and a band differential gain (hereinafter, referred to as "BDG") while maximally broadening an amplification band. According to the optical amplification device having such a configuration, power of a main signal line decreases only due to a loss caused by insertion of a wavelength-division multiplexing coupler that divides idler light from an optical signal. Thus, an optical signal having sufficient signal power can also be transmitted to a power monitor.

First Embodiment

Hereinafter, a first embodiment of the present invention will be described.

[Configuration of Optical Amplification Device]

Figure 1:
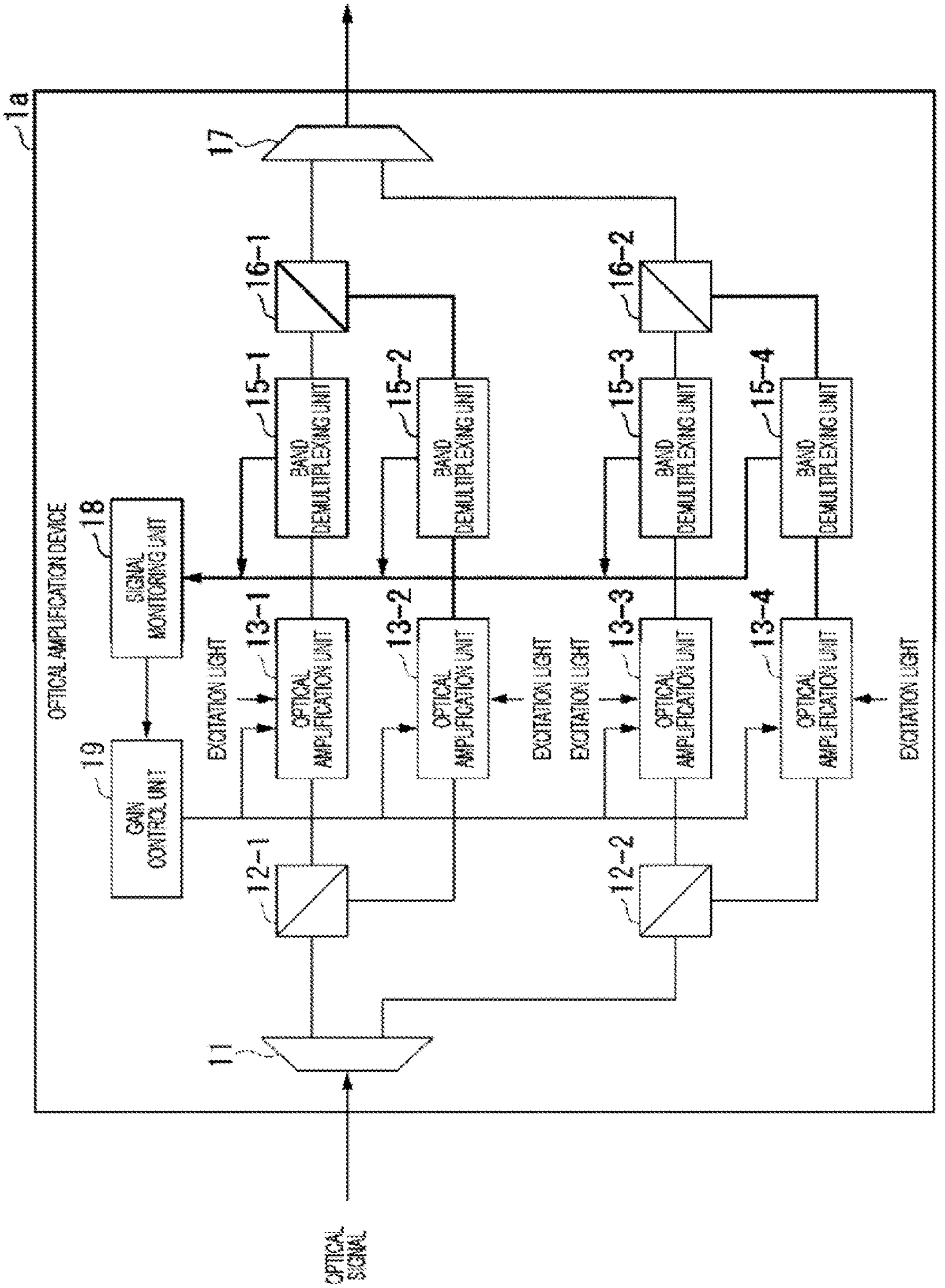
FIG. 1 is an overall configuration diagram of an optical amplification device 1*a* according to a first embodiment of the present invention.

Hereinafter, a configuration of an optical amplification device according to the present embodiment will be described. FIG. 1 is an overall configuration diagram of an optical amplification device 1*a* according to the first embodiment of the present invention. As illustrated in FIG. 1, the optical amplification device 1*a* includes a band demultiplexing unit 11, polarization separation units 12-1 and 12-2, optical amplification units 13-1 to 13-4, band demultiplexing units 15-1 to 15-4, polarization combination units 16-1 to 16-2, a band multiplexing unit 17, a signal monitoring unit 18, and a gain control unit 19.

An optical signal is input to the optical amplification device 1*a*. The optical amplification device 1*a* amplifies the input optical signal and outputs the amplified optical signal to, for example, an optical fiber transmission line. The optical amplification device 1*a* is, for example, an optical amplifier provided at regular intervals in an optical fiber transmission system of an optical amplification relay transmission method. The optical amplification device 1*a* compensates for an optical loss caused when the optical signal propagates through the optical fiber.

The band demultiplexing unit 11 demultiplexes the optical signal input to the optical amplification device 1*a*. The band demultiplexing unit 11 demultiplexes the optical signal into components A and B that are two band components with respect to a center frequency (hereinafter, referred to as "fundamental frequency") of a phase matching condition of an amplification medium. This is because idler light, which is phase conjugate light of the input optical signal, is generated at a frequency symmetric to the fundamental frequency with optical parametric amplification described later. The band demultiplexing unit 11 outputs the optical signal of the component A to the polarization separation unit 12-1 and outputs the optical signal of the component B to the polarization separation unit 12-2.

The polarization separation unit 12-1 separates the optical signal of the component A output from the band demultiplexing unit 11 by using, for example, a polarization beam splitter. This is because a nonlinear phenomenon in the nonlinear medium has polarization dependence. The polarization separation unit 12-1 separates the optical signal of the component A into components Ax and Ay that are two components in orthogonal polarization states. The polarization separation unit 12-1 outputs the optical signal of the component Ax to the optical amplification unit 13-1 and outputs the optical signal of the component Ay to the optical amplification unit 13-2.

The polarization separation unit 12-2 separates the optical signal of the component B output from the band demultiplexing unit 11 by using, for example, a polarization beam splitter. As described above, this is because the nonlinear phenomenon in the nonlinear medium has polarization dependence. The polarization separation unit 12-2 separates the optical signal of the component B into components Bx and By that are two components in orthogonal polarization states. The polarization separation unit 12-2 outputs the optical signal of the component Bx to the optical amplification unit 13-3 and outputs the optical signal of the component By to the optical amplification unit 13-4.

The optical amplification units 13-1 to 13-4 each include an optical parametric amplifier having a highly nonlinear medium such as a second-order or third-order nonlinear medium. The optical amplification units 13-1 to 13-4 each perform optical parametric amplification on the input optical signal.

The optical signal of the component Ax output from the polarization separation unit 12-1 and excitation light are input to the optical amplification unit 13-1. The optical amplification unit 13-1 performs optical parametric amplification by using the optical signal of the component Ax and the excitation light. When the optical parametric amplification is performed, idler light (phase conjugate light) serving as a phase conjugate component of the optical signal of the component Ax is generated. The idler light is generated at a frequency symmetric to a frequency of the optical signal of the component Ax with respect to the fundamental frequency of the amplification medium. The optical amplification unit 13-1 outputs the optical signal subjected to the optical parametric amplification to the band demultiplexing unit 15-1.

The optical signal of the component Ay output from the polarization separation unit 12-1 and excitation light are input to the optical amplification unit 13-2. The optical amplification unit 13-2 performs optical parametric amplification by using the optical signal of the component Ay and the excitation light. When the optical parametric amplification is performed, idler light serving as a phase conjugate component of the optical signal of the component Ay is generated. The idler light is generated at a frequency symmetric to a frequency of the optical signal of the component Ay with respect to the fundamental frequency of the amplification medium. The optical amplification unit 13-2 outputs the optical signal subjected to the optical parametric amplification to the band demultiplexing unit 15-2.

The optical signal of the component Bx output from the polarization separation unit 12-2 and excitation light are input to the optical amplification unit 13-3. The optical amplification unit 13-3 performs optical parametric amplification by using the optical signal of the component Bx and the excitation light. When the optical parametric amplification is performed, idler light serving as a phase conjugate component of the optical signal of the component Bx is generated. The idler light is generated at a frequency symmetric to a frequency of the optical signal of the component Bx with respect to the fundamental frequency of the amplification medium. The optical amplification unit 13-3 outputs the optical signal subjected to the optical parametric amplification to the band demultiplexing unit 15-3.

The optical signal of the component By output from the polarization separation unit 12-2 and excitation light are input to the optical amplification unit 13-4. The optical amplification unit 13-4 performs optical parametric amplification by using the optical signal of the component By and the excitation light. When the optical parametric amplification is performed, idler light serving as a phase conjugate component of the optical signal of the component By is generated. The idler light is generated at a frequency symmetric to a frequency of the optical signal of the component By with respect to the fundamental frequency of the amplification medium. The optical amplification unit 13-4 outputs the optical signal subjected to the optical parametric amplification to the band demultiplexing unit 15-4.

The optical amplification device 1*a* according to the first embodiment separates a band of an optical signal component from a band of an idler component before re-multiplexing the amplified optical signal of the component Ax and the amplified optical signal of the component Ay. Similarly, the optical amplification device 1*a* separates a band of an optical signal component from a band of an idler component before re-multiplexing the amplified optical signal of the component Bx and the amplified optical signal of the component By.

The band demultiplexing unit 15-1 demultiplexes the optical signal output from the optical amplification unit 13-1 into the band of the optical signal component and the band of the idler component. The band demultiplexing unit 15-1 outputs an optical signal in either the band of the optical signal component or the band of the idler component to the signal monitoring unit 18 and outputs an optical signal in the other band to the polarization combination unit 16-1.

The band demultiplexing unit 15-2 demultiplexes the optical signal output from the optical amplification unit 13-2 into the band of the optical signal component and the band of the idler component. The band demultiplexing unit 15-2 outputs an optical signal in either the band of the optical signal component or the band of the idler component to the signal monitoring unit 18 and outputs an optical signal in the other band to the polarization combination unit 16-1.

Here, the band of the optical signal output from the band demultiplexing unit 15-2 to the signal monitoring unit 18 is the same as the above-described band of the optical signal output from the band demultiplexing unit 15-1 to the signal monitoring unit 18. Therefore, similarly, the band of the optical signal output from the band demultiplexing unit 15-2 to the polarization combination unit 16-1 is the same as the band of the optical signal output from the band demultiplexing unit 15-1 to the polarization combination unit 16-1.

The band demultiplexing unit 15-3 demultiplexes the optical signal output from the optical amplification unit 13-3 into the band of the optical signal component and the band of the idler component. The band demultiplexing unit 15-3 outputs an optical signal in either the band of the optical signal component or the band of the idler component to the signal monitoring unit 18 and outputs an optical signal in the other band to the polarization combination unit 16-2.

Here, the band of the optical signal output from the band demultiplexing unit 15-3 to the signal monitoring unit 18 is the same as the above-described band of the optical signal output from the band demultiplexing unit 15-1 to the polarization combination unit 16-1. Therefore, the band of the optical signal output from the band demultiplexing unit 15-3 to the polarization combination unit 16-2 is the same as the band of the optical signal output from the band demultiplexing unit 15-1 to the signal monitoring unit 18. That is, the band demultiplexing unit 15-3 outputs, to the signal monitoring unit 18, the optical signal in the band that has not been output from the band demultiplexing unit 15-1 to the signal monitoring unit 18 and outputs, to the polarization combination unit 16-2, the optical signal in the band that has not been output from the band demultiplexing unit 15-1 to the polarization combination unit 16-1.

The band demultiplexing unit 15-4 demultiplexes the optical signal output from the optical amplification unit 13-4 into the band of the optical signal component and the band of the idler component. The band demultiplexing unit 15-4 outputs an optical signal in either the band of the optical signal component or the band of the idler component to the signal monitoring unit 18 and outputs an optical signal in the other band to the polarization combination unit 16-2.

Here, the band of the optical signal output from the band demultiplexing unit 15-4 to the signal monitoring unit 18 is the same as the above-described band of the optical signal output from the band demultiplexing unit 15-1 to the polarization combination unit 16-1. Therefore, the band of the optical signal output from the band demultiplexing unit 15-4 to the polarization combination unit 16-2 is the same as the above-described band of the optical signal output from the band demultiplexing unit 15-1 to the signal monitoring unit 18. That is, the band demultiplexing unit 15-4 outputs, to the signal monitoring unit 18, the optical signal in the band that has not been output from the band demultiplexing unit 15-1 to the signal monitoring unit 18 and outputs, to the polarization combination unit 16-2, the optical signal in the band that has not been output from the band demultiplexing unit 15-1 to the polarization combination unit 16-1.

The polarization combination unit 16-1 multiplexes the optical signal output from the band demultiplexing unit 15-1 and the optical signal output from the band demultiplexing unit 15-2 by using, for example, a polarization beam splitter. The polarization combination unit 16-1 outputs the multiplexed optical signal to the band multiplexing unit 17.

The polarization combination unit 16-2 multiplexes the optical signal output from the band demultiplexing unit 15-3 and the optical signal output from the band demultiplexing unit 15-4 by using, for example, a polarization beam splitter. The polarization combination unit 16-2 outputs the multiplexed optical signal to the band multiplexing unit 17.

The band multiplexing unit 17 multiplexes the optical signal of the component A output from the polarization combination unit 16-1 and the optical signal of the component B output from the polarization combination unit 16-2. The band multiplexing unit 17 outputs the multiplexed optical signal to the optical fiber transmission line.

With the above configuration, the signal monitoring unit 18 receives input of the optical signal components of the components Ax, Ay, Bx, and By that have not been output to the optical fiber transmission line or the idler components that have not been output to the optical fiber transmission line.

The signal monitoring unit 18 acquires an optical power distribution (hereinafter, referred to as "spectrum") in a frequency direction of the input optical signal by using, for example, an optical spectrum analyzer. In the OPA, the optical signal and the idler light are ideally complete copies, except that the optical signal and the idler light are phase-conjugate. Thus, a spectrum, which is obtained by inverting the spectrum with respect to the fundamental frequency, indicates a spectrum of the optical signal output to the optical fiber transmission line. Therefore, the signal monitoring unit 18 can indirectly monitor the spectrum of the optical signal output to the optical fiber transmission line.

Again spectrum of the OPA is determined based on the phase matching condition of the amplification medium and can be changed by adjusting the temperature of the amplification medium. For example, the temperature of the amplification medium can be changed by a temperature adjustment member such as a Peltier element or a heater attached to the amplification medium.

Figure 2:
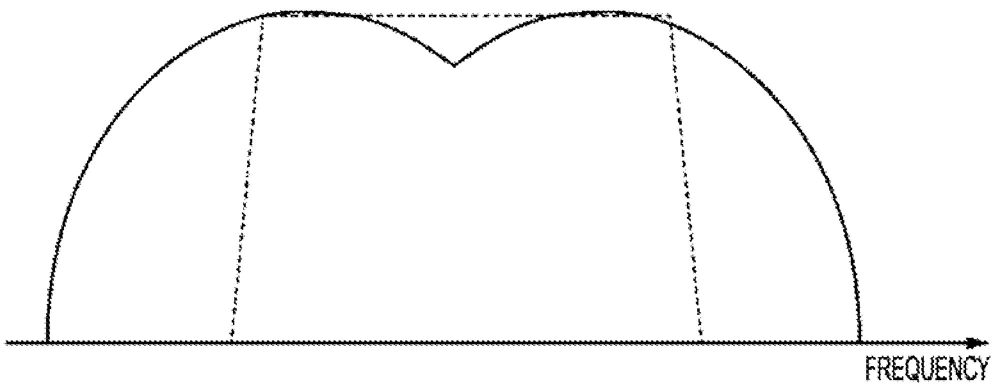
FIG. 2 is an explanatory diagram of a change in a gain spectrum caused by a change in a phase matching condition.

FIG. 2 is an explanatory diagram of a change in a gain spectrum caused by a change in the phase matching condition. FIG. 2 schematically illustrates the gain spectrum of the OPA.

In FIG. 2, a broken line indicates a gain spectrum under an optimal phase matching condition. When the temperature of the amplification medium is changed in this gain spectrum state, the gain spectrum changes to again spectrum indicated by a solid line in FIG. 2. That is, the change in the temperature of the amplification medium decreases the gain near the fundamental frequency and increases the gain near the outer frequency (at both ends of the gain spectrum).

A power difference between frequency components can be allowed to some extent, and the allowable amount is determined based on a specification of a transmission system. The specification of the transmission system herein includes a gain flattening filter, a transmission distance, and the like.

In the present embodiment, the gain control unit 19 in FIG. 1 controls a temperature adjustment unit (not illustrated) provided in each of the optical amplification units 13-1 to 13-4 to adjust the temperature of the amplification medium included in each of the optical amplification units 13-1 to 13-4, thereby controlling the gain. The gain control unit 19 controls each temperature adjustment unit (not illustrated) to perform control so as to reduce the gain near the fundamental frequency of the gain spectrum and broaden the band as much as possible within the allowable power difference. When a difference between the gain near the fundamental frequency and a maximum gain matches the allowable power difference, amplification in the broadest band is achieved.

Hereinafter, a method of controlling the gain of each amplification medium by using the gain control unit 19 will be described.

First, the gain control unit 19 performs control for setting the phase matching characteristic of the amplification medium to an optimal state. The gain control unit 19 acquires a spectrum that is a monitoring value from the signal monitoring unit 18. The gain control unit 19 acquires peak power and power at a frequency closest to the fundamental frequency from the acquired spectrum.

The gain control unit 19 controls the temperature adjustment unit (not illustrated) provided in each of the optical amplification units 13-1 to 13-4 to adjust the temperature of each amplification medium and controls a difference between the peak power and the power at the English Translation of frequency closest to the fundamental frequency so that the difference becomes smallest.

Next, the gain control unit 19 controls each temperature adjustment unit (not illustrated) to change the temperature of each amplification medium from a temperature at which the optimal phase matching state is obtained. Because the phase matching characteristic of the amplification medium changes, the gain near the fundamental frequency decreases, and gains on both end sides of the gain spectrum increase.

The gain control unit 19 controls each temperature adjustment unit (not illustrated) to further change the temperature of the amplification medium, and, when the difference between the power near the fundamental frequency and the peak power exceeds the allowable power difference, the gain control unit determines a temperature in an immediately previous state as an optimal state for achieving the broadest amplification band. The gain control unit 19 performs the above control in all the amplification media included in the respective optical amplification units 13-1 to 13-4.

Finally, in order to minimize the PDG, the gain control unit 19 adjusts optical power of the excitation light to be input to each of the optical amplification units 13-1 to 13-4 so that the peak powers of the spectra that are monitoring values monitored by the signal monitoring unit 18 match with each other. Specifically, the gain control unit 19 controls the optical power of the excitation light so as to match with output peak power of the amplification medium having the smallest gain.

The optical power of the excitation light can be controlled by adjusting a control current of an optical amplifier used for amplifying the excitation light or output power of a light source. In the OPA using the second-order nonlinear optical medium, a frequency of the excitation light needs to be twice the fundamental frequency. In this case, a configuration may be used in which light of the fundamental frequency is convened into excitation light by second harmonic generation using another nonlinear optical medium. In this case, the optical power of the excitation light can also be adjusted by, for example, adjusting the temperature of the amplification medium to control efficiency of the second harmonic generation.

In a case where a gain difference is large between the band components, control of the BDG can be similarly performed. The control of the BDG, as well as the above-described control of the PDG, is basically performed to be uniform. However, an optical signal input to the OPA may have a power difference depending on the frequency due to a loss spectrum, stimulated Raman scattering, and the like in the optical fiber transmission line. A nearly linear power difference can be compensated for to some extent by providing a gain difference between the component A and the component B at the time of controlling the BDG.

[Operation of Optical Amplification Device]

Figure 3:
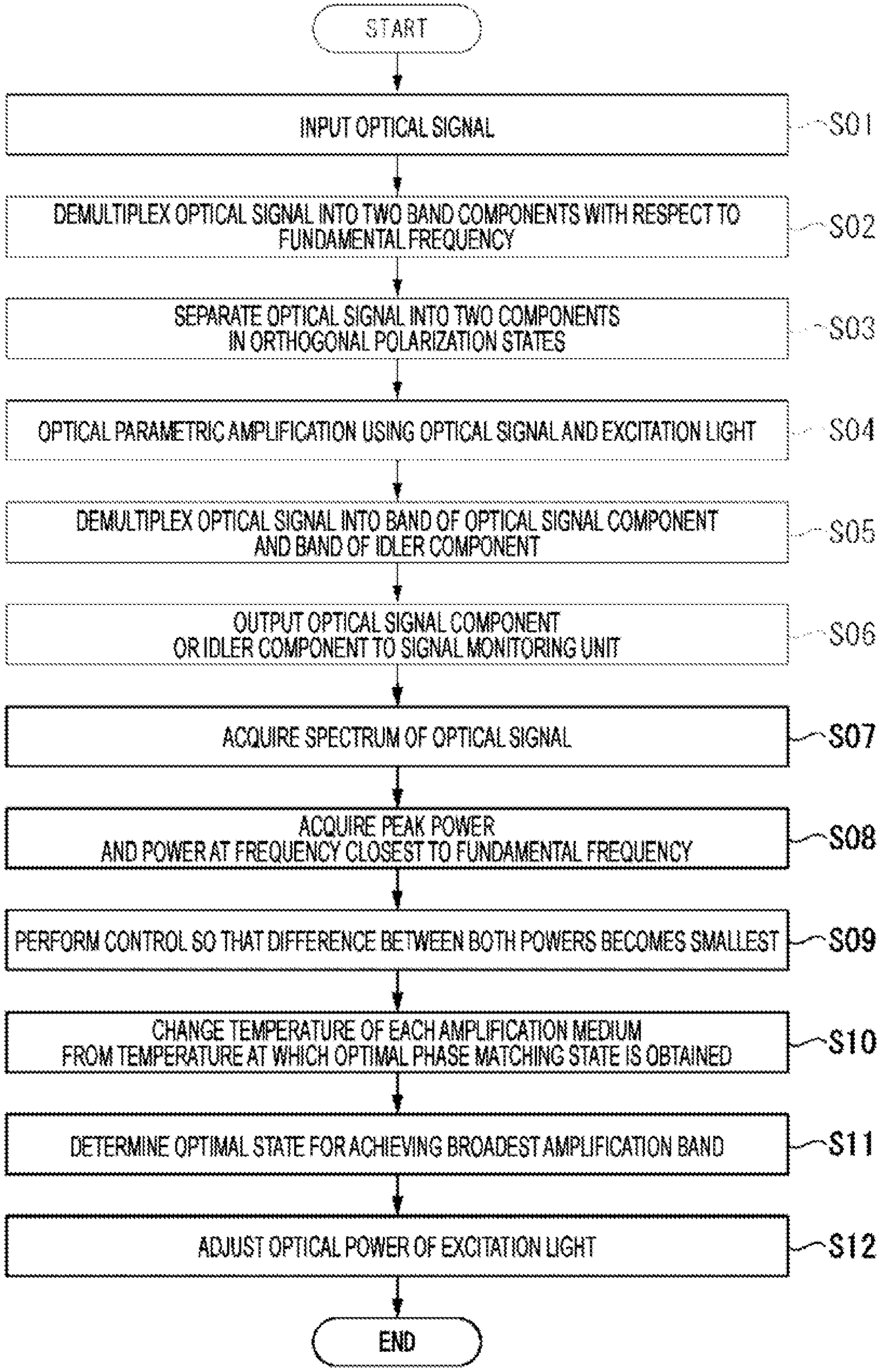
FIG. 3 is a flowchart showing an operation of the optical amplification device 1*a* according to the first embodiment of the present invention.

Hereinafter, an example of an operation of the optical amplification device in the present embodiment will be described. FIG. 3 is a flowchart showing an operation of the optical amplification device 1*a* according to the first embodiment of the present invention.

An optical signal is input to the optical amplification device 1*a* (step S01). The band demultiplexing unit 11 demultiplexes the optical signal into components A and B that are two band components with respect to a fundamental frequency serving as a center frequency of a phase matching condition of an amplification medium. The band demultiplexing unit 11 outputs the optical signal of the component A to the polarization separation unit 12-1 and outputs the optical signal of the component B to the polarization separation unit 12-2 (step S02).

The polarization separation unit 12-1 separates the optical signal of the component A into components Ax and Ay that are two components in orthogonal polarization states. The polarization separation unit 12-1 outputs the optical signal of the component Ax to the optical amplification unit 13-1 and outputs the optical signal of the component Ay to the optical amplification unit 13-2. The polarization separation unit 12-2 separates the optical signal of the component B into components Bx and By that are two components in orthogonal polarization states. The polarization separation unit 12-2 outputs the optical signal of the component Bx to the optical amplification unit 13-3 and outputs the optical signal of the component By to the optical amplification unit 13-4 (step S03).

The optical amplification unit 13-1 performs optical parametric amplification by using the optical signal of the component Ax and excitation light. The optical amplification unit 13-1 outputs the optical signal subjected to the optical parametric amplification to the band demultiplexing unit 15-1. The optical amplification unit 13-2 performs optical parametric amplification by using the optical signal of the component Ay and excitation light. The optical amplification unit 13-2 outputs the optical signal subjected to the optical parametric amplification to the band demultiplexing unit 15-2. The optical amplification unit 13-3 performs optical parametric amplification by using the optical signal of the component Bx and excitation light. The optical amplification unit 13-3 outputs the optical signal subjected to the optical parametric amplification to the band demultiplexing unit 15-3. The optical amplification unit 13-4 performs optical parametric amplification by using the optical signal of the component By and excitation light. The optical amplification unit 13-4 outputs the optical signal subjected to the optical parametric amplification to the band demultiplexing unit 15-4 (step S04).

The band demultiplexing unit 15-1 demultiplexes the optical signal output from the optical amplification unit 13-1 into a band of an optical signal component and a band of an idler component. The band demultiplexing unit 15-2 demultiplexes the optical signal output from the optical amplification unit 13-2 into the band of the optical signal component and the band of the idler component. The band demultiplexing unit 15-3 demultiplexes the optical signal output from the optical amplification unit 13-3 into the band of the optical signal component and the band of the idler component. The band demultiplexing unit 15-4 demultiplexes the optical signal output from the optical amplification unit 13-4 into the band of the optical signal component and the band of the idler component (step SOS).

The band demultiplexing unit 15-1 outputs an optical signal in either the band of the optical signal component or the band of the idler component to the signal monitoring unit 18 and outputs an optical signal in the other band to the polarization combination unit 16-1. The band demultiplexing unit 15-2 outputs an optical signal in either the band of the optical signal component or the band of the idler component to the signal monitoring unit 18 and outputs an optical signal in the other band to the polarization combination unit 16-1. The band demultiplexing unit 15-3 outputs an optical signal in either the band of the optical signal component or the band of the idler component to the signal monitoring unit 18 and outputs an optical signal in the other band to the polarization combination unit 16-2. The band demultiplexing unit 15-4 outputs an optical signal in either the band of the optical signal component or the band of the idler component to the signal monitoring unit 18 and outputs an optical signal in the other band to the polarization combination unit 16-2 (step S06).

Here, the band of the optical signal output from the band demultiplexing unit 15-2 to the signal monitoring unit 18 is the same as the above-described band of the optical signal output from the band demultiplexing unit 15-1 to the signal monitoring unit 18. Therefore, similarly, the band of the optical signal output from the band demultiplexing unit 15-2 to the polarization combination unit 16-1 is the same as the band of the optical signal output from the band demultiplexing unit 15-1 to the polarization combination unit 16-1. Further, the band of the optical signal output from the band demultiplexing unit 15-3 to the signal monitoring unit 18 is the same as the above-described band of the optical signal output from the band demultiplexing unit 15-1 to the polarization combination unit 16-1. Therefore, the band of the optical signal output from the band demultiplexing unit 15-3 to the polarization combination unit 16-2 is the same as the band of the optical signal output from the band demultiplexing unit 15-1 to the signal monitoring unit 18. Further, the band of the optical signal output from the band demultiplexing unit 15-4 to the signal monitoring unit 18 is the same as the above-described band of the optical signal output from the band demultiplexing unit 15-1 to the polarization combination unit 16-1. Therefore, the band of the optical signal output from the band demultiplexing unit 15-4 to the polarization combination unit 16-2 is the same as the above-described band of the optical signal output from the band demultiplexing unit 15-1 to the signal monitoring unit 18.

The signal monitoring unit 18 acquires a spectrum that is an optical power distribution in the frequency direction of the optical signal (step S07). The gain control unit 19 acquires peak power and power at a frequency closest to the fundamental frequency from the spectrum that is the monitoring value monitored by the signal monitoring unit 18 (step S08).

The gain control unit 19 controls the temperature adjustment unit (not illustrated) provided in each of the optical amplification units 13-1 to 13-4 to adjust the temperature of each amplification medium and controls a difference between the peak power and the power at the frequency closest to the fundamental frequency so that the difference becomes smallest (step S09).

The gain control unit 19 controls each temperature adjustment unit (not illustrated) to change the temperature of each amplification medium from a temperature at which the optimal phase matching state is obtained (step S10). The gain control unit 19 controls each temperature adjustment unit (not illustrated) to further change the temperature of the amplification medium, and, when the difference between the power near the fundamental frequency and the peak power exceeds the allowable power difference, the gain control unit determines a temperature in an immediately previous state as an optimal state for achieving the broadest amplification band (step S11).

In order to minimize the PDG, the gain control unit 19 adjusts optical power of excitation light to be input to each of the optical amplification units 13-1 to 13-4 so that the peak powers of the spectra match with each other (step S12). Thus, the operation of the optical amplification device 1*a* in the flowchart of FIG. 3 ends.

As described above, in optical signal amplification using optical parametric amplification and wavelength conversion, the optical amplification device 1*a* according to the first embodiment monitors optical power of a band component not used for transmission, thereby maximizing the amplification band while suppressing the polarization differential gain (PDG) and the band differential gain (BDG). The optical amplification device 1*a* according to the first embodiment can monitor signal power of amplified light while preventing a decrease in signal power of a main signal line and occurrence of a measurement error caused by weakness of monitor light.

Second Embodiment

Hereinafter, a second embodiment of the present invention will be described.

[Configuration of Optical Amplification Device]

Figure 4:
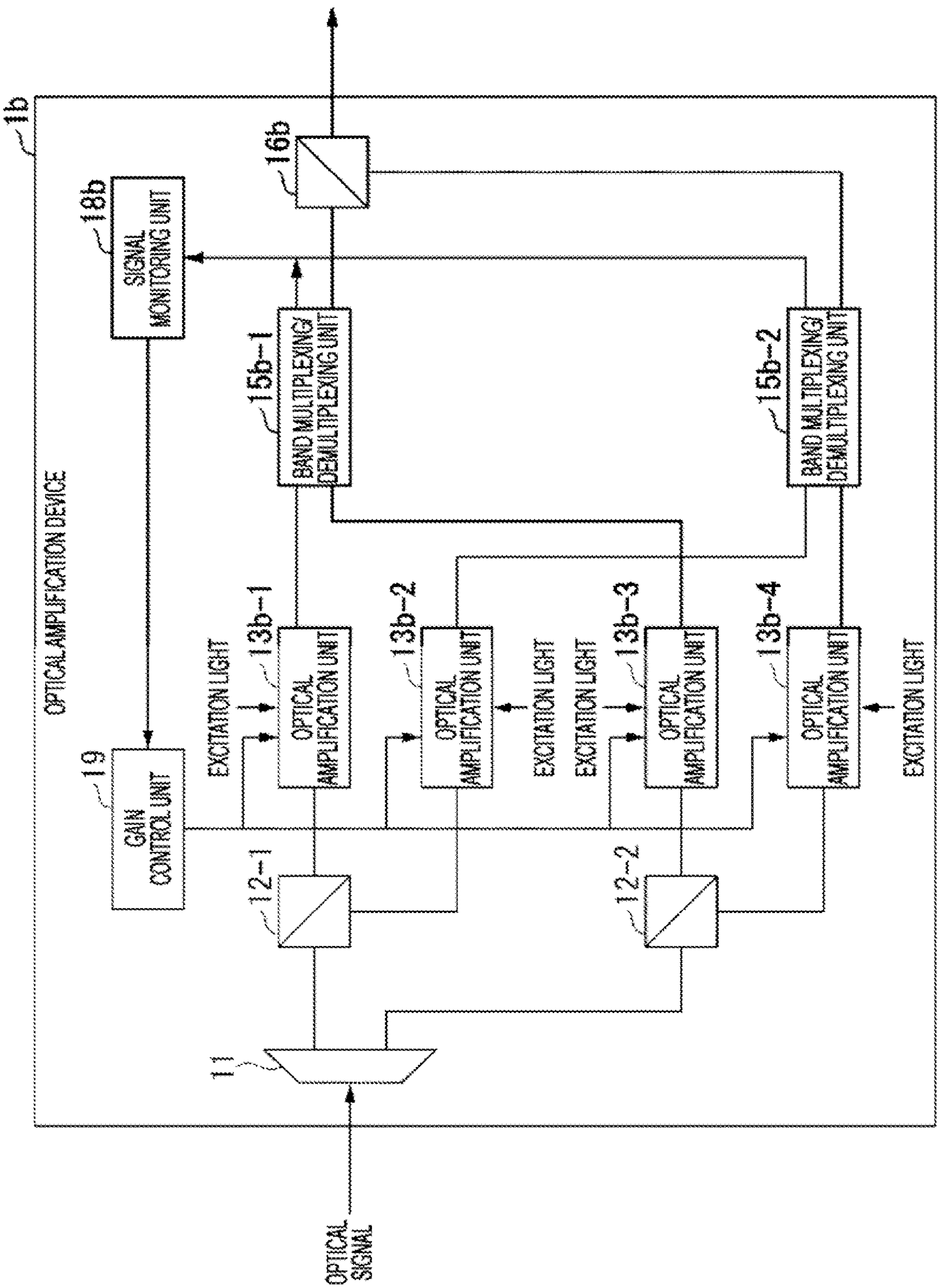
FIG. 4 is an overall configuration diagram of an optical amplification device 1*b* according to a second embodiment of the present invention.

Hereinafter, a configuration of an optical amplification device according to the present embodiment will be described. FIG. 4 is an overall configuration diagram of an optical amplification device 1*b* according to the second embodiment of the present invention. Note that, among components of the optical amplification device 1*b* in FIG. 4, components having the same configuration as the components of the optical amplification device 1*a* in the first embodiment illustrated in FIG. 1 will be denoted by the same reference signs as those in the first embodiment, and description thereof will be omitted.

As illustrated in FIG. 4, the optical amplification device 1*b* includes a band demultiplexing unit 11, polarization separation units 12-1 and 12-2, optical amplification units 13*b*-1 to 13*b*-4, band multiplexing/demultiplexing units 15*b*-1 and 15*b*-2, a polarization combination unit 16*b*, a signal monitoring unit 18*b*, and a gain control unit 19.

The optical amplification units 13*b*-1 to 13*b*-4 each include an optical parametric amplifier having a highly nonlinear medium such as a second-order or third-order nonlinear medium. The optical amplification units 13*b*-1 to 13*b*-4 each perform optical parametric amplification on an input optical signal.

An optical signal of a component Ax output from the polarization separation unit 12-1 and excitation light are input to the optical amplification unit 13*b*-1. The optical amplification unit 13*b*-1 performs optical parametric amplification by using the optical signal of the component Ax and the excitation light. When the optical parametric amplification is performed, idler light serving as a phase conjugate component of the optical signal of the component Ax is generated. The idler light is generated at a frequency symmetric to a frequency of the optical signal of the component Ax with respect to the fundamental frequency of the amplification medium. The optical amplification unit 13*b*-1 outputs the optical signal subjected to the optical parametric amplification to the band multiplexing/demultiplexing unit 15*b*-1.

An optical signal of a component Ay output from the polarization separation unit 12-1 and excitation light are input to the optical amplification unit 13*b*-2. The optical amplification unit 13*b*-2 performs optical parametric amplification by using the optical signal of the component Ay and the excitation light. When the optical parametric amplification is performed, idler light serving as a phase conjugate component of the optical signal of the component Ay is generated. The idler light is generated at a frequency symmetric to a frequency of the optical signal of the component Ay with respect to the fundamental frequency of the amplification medium. The optical amplification unit 13*b*-2 outputs the optical signal subjected to the optical parametric amplification to the band multiplexing/demultiplexing unit 15*b*-2.

An optical signal of a component Bx output from the polarization separation unit 12-2 and excitation light are input to the optical amplification unit 13*b*-3. The optical amplification unit 13*b*-3 performs optical parametric amplification by using the optical signal of the component Bx and the excitation light. When the optical parametric amplification is performed, idler light serving as a phase conjugate component of the optical signal of the component Bx is generated. The idler light is generated at a frequency symmetric to a frequency of the optical signal of the component Bx with respect to the fundamental frequency of the amplification medium. The optical amplification unit 13*b*-3 outputs the optical signal subjected to the optical parametric amplification to the band multiplexing/demultiplexing unit 15*b*-1.

An optical signal of the component By output from the polarization separation unit 12-2 and excitation light are input to the optical amplification unit 13*b*-4. The optical amplification unit 13*b*-4 performs optical parametric amplification by using the optical signal of the component By and the excitation light. When the optical parametric amplification is performed, idler light serving as a phase conjugate component of the optical signal of the component By is generated. The idler light is generated at a frequency symmetric to a frequency of the optical signal of the component By with respect to the fundamental frequency of the amplification medium. The optical amplification unit 13*b*-4 outputs the optical signal subjected to the optical parametric amplification to the band multiplexing/demultiplexing unit 15*b*-2.

The band multiplexing/demultiplexing unit 15*b*-1 multiplexes the optical signal output from the optical amplification unit 13*b*-1 and the optical signal output from the optical amplification unit 13*b*-3. The band multiplexing/demultiplexing unit 15*b*-1 demultiplexes the multiplexed optical signal into a band of an optical signal component and a band of an idler component. The band multiplexing/demultiplexing unit 15*b*-1 outputs an optical signal in either the band of the optical signal component or the band of the idler component to the signal monitoring unit 18*b* and outputs an optical signal in the other band to the polarization combination unit 16*b*.

The band multiplexing/demultiplexing unit 15*b*-2 multiplexes the optical signal output from the optical amplification unit 13*b*-2 and the optical signal output from the optical amplification unit 13*b*-4. The band multiplexing/demultiplexing unit 15*b*-2 demultiplexes the multiplexed optical signal into the band of the optical signal component and the band of the idler component. The band multiplexing/demultiplexing unit 15*b*-2 outputs an optical signal in either the band of the optical signal component or the band of the idler component to the signal monitoring unit 18*b* and outputs an optical signal in the other band to the polarization combination unit 16*b*.

Here, the band of the optical signal output from the band multiplexing/demultiplexing unit 15*b*-2 to the signal monitoring unit 18*b* is the same as the above-described band of the optical signal output from the band multiplexing/demultiplexing unit 15*b*-1 to the polarization combination unit 16*b*. Therefore, the band of the optical signal output from the band multiplexing/demultiplexing unit 15*b*-2 to the polarization combination unit 16*b* is the same as the above-described band of the optical signal output from the band multiplexing/demultiplexing unit 15*b*-1 to the signal monitoring unit 18*b*. That is, the band multiplexing/demultiplexing unit 15*b*-3 outputs, to the signal monitoring unit 18*b*, the optical signal in the band that has not been output from the band multiplexing/demultiplexing unit 15*b*-1 to the signal monitoring unit 18*b* and outputs, to the polarization combination unit 16*b*, the optical signal in the band that has not been output from the band demultiplexing unit 15*b*-1 to the polarization combination unit 16*b*.

The polarization combination unit 16*b* multiplexes the optical signal output from the band multiplexing/demultiplexing unit 15*b*-1 and the optical signal output from the band multiplexing/demultiplexing unit 15*b*-2 by using, for example, a polarization beam splitter. The polarization combination unit 16*b* outputs the multiplexed optical signal to the optical fiber transmission line.

The signal monitoring unit 18*b* acquires a spectrum that is an optical power distribution in a frequency direction of the input optical signal by using, for example, an optical spectrum analyzer. The gain control unit 19 acquires a spectrum that is a monitoring value from the signal monitoring unit 18*b*.

The above optical amplification device 1*a* according to the first embodiment is configured to multiplex bands after multiplexing polarized waves. Therefore, in the first embodiment, it is necessary to extract idler light before multiplexing the polarized waves. In the configuration of the optical amplification device 1*a* according to the first embodiment, an optical signal passes through two wavelength filters, which increases an insertion loss. The two wavelength filters herein are a wavelength filter for separating idler light and a wavelength filter for re-multiplexing optical signals.

Meanwhile, the optical amplification device 1*b* according to the second embodiment in FIG. 4 multiplexes signal bands of respective polarized waves before multiplexing the polarized waves. The optical amplification device 1*b* according to the second embodiment can include only one wavelength filter through which the optical signal passes. Therefore, the optical amplification device 1*b* according to the second embodiment can reduce a loss after the optical signal is amplified. The wavelength filter used herein may be, for example, a 2×2 wavelength selective switch including a liquid crystal on silicon (LCOS) or a variable mirror.

Third Embodiment

Hereinafter, a third embodiment of the present invention will be described.

In a case where a gain of the OPA is not sufficiently large, a power difference occurs between an optical signal and idler light. Thus, the idler light does not function as a power monitor of the optical signal. Therefore, the idler light can be used for the purpose of monitoring a shape of an amplification band, but it is difficult to use the idler light for the purpose of controlling a PDG. In view of this, an optical amplification device according to the third embodiment performs gain control by observing a noise floor in a band of the idler light.

Noise caused by optical amplification is proportional to an amplification gain. Therefore, in a case where power of the noise floor matches in each medium, output of the optical signal also matches. At this time, in an amplification relay transmission method, a noise component in a subsequent optical amplifier has noise components of preceding optical amplifiers, and it is difficult to observe only a noise floor generated in an observed optical amplifier.

Figure 5:
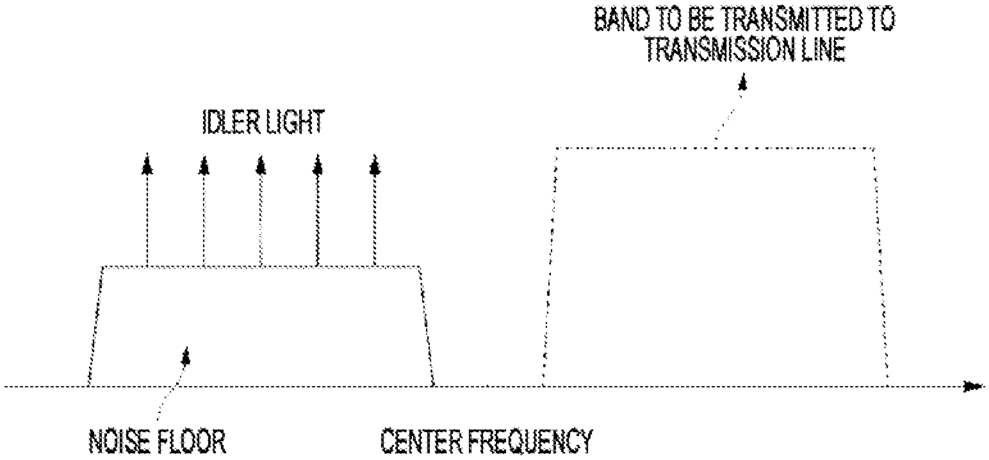
FIG. 5 is an explanatory diagram of a method of measuring a noise floor in a band of idler light.

Meanwhile, in a case of the OPA, an unnecessary band component is cut each time amplification is performed, and a band is divided at the time of the amplification. Thus, the noise floor of the idler light is mostly derived from noise generated in the observed optical amplifier. Therefore, as illustrated in FIG. 5, by measuring the noise floor in the band of the acquired idler light, it is possible to combine output from each amplification medium as in the first embodiment described above.

According to the above-described embodiment, an optical amplification device (an optical amplification apparatus) includes a polarization demultiplexing unit (a polarization demultiplexer), a first optical amplification unit (a first optical amplifier), a second optical amplification unit (a second optical amplifier), a first band demultiplexing unit (a first band demultiplexer), a second band demultiplexing unit (a second band demultiplexer), a signal monitoring unit (a signal monitor), an amplification gain control unit (an amplification gain controller), and a polarization combination unit (a polarization combinator). For example, the optical amplification device is the optical amplification device 1*a* in the embodiment, the polarization demultiplexing unit is the polarization separation unit 12-1 in the embodiment, the first optical amplification unit is the optical amplification unit 13-1 in the embodiment, the second optical amplification unit is the optical amplification unit 13-2 in the embodiment, the first band demultiplexing unit is the band demultiplexing unit 15-1 in the embodiment, the second band demultiplexing unit is the band demultiplexing unit 15-2 in the embodiment, the signal monitoring unit is the signal monitoring unit 18 in the embodiment, the amplification gain control unit is the gain control unit 19 in the embodiment, and the polarization combination unit is the polarization combination unit 16-1 in the embodiment.

The polarization demultiplexing unit separates the optical signal into a first polarized wave and a second polarized wave orthogonal to each other. For example, the first polarized wave is the optical signal of the component Ax in the embodiment, and the second polarized wave is the optical signal of the component Ay in the embodiment. The first optical amplification unit amplifies the first polarized wave by using a first amplification medium. For example, the first amplification medium is an amplification medium included in the optical amplification unit 13-1 in the embodiment. The second optical amplification unit amplifies the second polarized wave by using a second amplification medium. For example, the second amplification medium is an amplification medium included in the optical amplification unit 13-2 in the embodiment. The first band demultiplexing unit demultiplexes the amplified first polarized wave into a band component of the first polarized wave and a band component of first phase conjugate light generated by the amplification. For example, the band component of the first phase conjugate light is the band of the idler light generated in the optical amplification unit 13-1 in the embodiment. The second band demultiplexing unit demultiplexes the amplified second polarized wave into a band component of the second polarized wave and a band component of second phase conjugate light generated by the amplification. For example, the band component of the second phase conjugate light is the band of the idler light generated in the optical amplification unit 13-2 in the embodiment. The signal monitoring unit measures a first optical power value of optical power of either the band component of the first polarized wave or the band component of the first phase conjugate light and a second optical power value of optical power of either the band component of the second polarized wave or the band component of the second phase conjugate light. The amplification gain control unit controls an amplification band and gain of the first amplification medium and an amplification band and gain of the second amplification medium on the basis of the first optical power value and the second optical power value. The polarization combination unit multiplexes the band component of the first polarized wave not measured by the signal monitoring unit and the band component of the second polarized wave not measured by the signal monitoring unit.

The amplification gain control unit may control phase matching characteristics of the first amplification medium and the second amplification medium and at least one of an optical power value of excitation light incident on the first amplification medium together with the first polarized wave or an optical power value of excitation light incident on the second amplification medium together with the second polarized wave on the basis of distributions of the first optical power value and the second optical power value such that the amplification bands of the first amplification medium and the second amplification medium are maximized and output powers of the first amplification medium and the second amplification medium match between the polarized waves. For example, the distributions of the first optical power value and the second optical power value are the spectra in the embodiment.

The amplification gain control unit may control phase matching characteristics of the first amplification medium and the second amplification medium and at least one of an optical power value of excitation light incident on the first amplification medium together with the first polarized wave or an optical power value of excitation light incident on the second amplification medium together with the second polarized wave on the basis of distributions of the first optical power value and the second optical power value such that the amplification bands of the first amplification medium and the second amplification medium are maximized or output powers of the first amplification medium and the second amplification medium match between the polarized waves.

The signal monitoring unit may measure the first optical power value of the optical power of the band component of the first polarized wave and the second optical power value of the optical power of the band component of the second phase conjugate light or may measure the first optical power value of the optical power of the band component of the first phase conjugate light and the second optical power value of the optical power of the band component of the second polarized wave.

The first optical amplification unit may amplify the first polarized wave by using first excitation light, the second optical amplification unit may amplify the second polarized wave by using second excitation light, and the amplification gain control unit may control optical power of the first excitation light and optical power of the second excitation light so as to match peak power of the first optical power value with peak power of the second optical power value.

The amplification gain control unit may control the optical power of the first excitation light and the optical power of the second excitation light so as to match with output peak power of the amplification medium having the smallest gain.

A part or all of the optical amplification device in each embodiment described above may be implemented by a computer. In that case, a program for implementing those functions may be recorded in a computer-readable recording medium, and the program recorded in the recording medium may be read and executed by a computer system to implement the functions. The "computer system" herein includes hardware such as an OS and peripheral devices. The "computer-readable recording medium" refers to a portable medium such as a flexible disk, a magneto-optical disc, a ROM, or a CD-ROM or a storage device such as a hard disk included in the computer system. Further, the "computer-readable recording medium" may include a medium that dynamically stores the program for a short time, such as a communication line in a case where the program is transmitted via a network such as the Internet or a communication line such as a telephone line, and a medium that stores the program for a certain period of time, such as a volatile memory inside the computer system serving as a server or a client in that case. The above program may be for implementing some of the functions described above, may implement the functions described above in combination with the program already recorded in the computer system, or may be implemented by using a programmable logic device such as a field programmable gate array (FPGA).

While the embodiments of the present invention have been described in detail with reference to the drawings, specific configurations are not limited to the embodiment and include design and the like without departing from the gist of the present invention.

REFERENCE SIGNS LIST

- 1*a* Optical amplification device (Optical amplification apparatus)
- 1*b* Optical amplification device (Optical amplification apparatus)
- 11 Band demultiplexing unit
- 12-1 Polarization separation unit
- 12-2 Polarization separation unit
- 13-1 Optical amplification unit
- 13-2 Optical amplification unit
- 13-3 Optical amplification unit

13-4 Optical amplification unit
**13*b*-1** Optical amplification unit
**13*b*-2** Optical amplification unit
**13*b*-3** Optical amplification unit
**13*b*-4** Optical amplification unit
15-1 Band demultiplexing unit
15-2 Band demultiplexing unit
15-3 Band demultiplexing unit
15-4 Band demultiplexing unit
**15*b*-1** Band multiplexing/demultiplexing unit
**15*b*-2** Band multiplexing/demultiplexing unit
**15*b*-3** Band multiplexing/demultiplexing unit
16-1 Polarization combination unit
16-2 Polarization combination unit
**16*b*** Polarization combination unit
17 Band multiplexing unit
18 Signal monitoring unit
**18*b*** Signal monitoring unit
19 Gain control unit

The invention claimed is:

1. An optical amplification device comprising:

a polarization demultiplexer that separates an optical signal into a first polarized wave and a second polarized wave orthogonal to each other;

a first optical amplifier that amplifies the first polarized wave by using a first amplification medium;

a second optical amplifier that amplifies the second polarized wave by using a second amplification medium;

a first band demultiplexer that demultiplexes the amplified first polarized wave into a band component of the first polarized wave and a band component of first phase conjugate light generated by the amplification;

a second band demultiplexer that demultiplexes the amplified second polarized wave into a band component of the second polarized wave and a band component of second phase conjugate light generated by the amplification;

a signal monitor that measures a first optical power value of optical power of either the band component of the first polarized wave or the band component of the first phase conjugate light and a second optical power value of optical power of either the band component of the second polarized wave or the band component of the second phase conjugate light;

an amplification gain controller that controls an amplification band and gain of the first amplification medium and an amplification band and gain of the second amplification medium on the basis of the first optical power value and the second optical power value; and a polarization combiner that multiplexes the band component of the first polarized wave not measured by the signal monitor and the band component of the second polarized wave not measured by the signal monitor.

2. The optical amplification device according to claim 1, wherein the amplification gain controller controls phase matching characteristics of the first amplification medium and the second amplification medium and at least one of an optical power value of excitation light incident on the first amplification medium together with the first polarized wave or an optical power value of excitation light incident on the second amplification medium together with the second polarized wave on the basis of distributions of the first optical power value and the second optical power value such that the amplification bands of the first amplification medium and the second amplification medium are maximized and output power of the first amplification medium and output power of the second amplification medium match between the polarized waves.

3. The optical amplification device according to claim 1, wherein the amplification gain controller controls phase matching characteristics of the first amplification medium and the second amplification medium and at least one of an optical power value of excitation light incident on the first amplification medium together with the first polarized wave or an optical power value of excitation light incident on the second amplification medium together with the second polarized wave on the basis of distributions of the first optical power value and the second optical power value such that the amplification bands of the first amplification medium and the second amplification medium are maximized or output power of the first amplification medium and output power of the second amplification medium match between the polarized waves.

4. The optical amplification device according to claim 1, wherein the signal monitor measures the first optical power value of the optical power of the band component of the first polarized wave and the second optical power value of the optical power of the band component of the second phase conjugate light or measures the first optical power value of the optical power of the band component of the first phase conjugate light and the second optical power value of the optical power of the band component of the second polarized wave.

5. The optical amplification device according to claim 1, wherein the first optical amplifier amplifies the first polarized wave by using first excitation light, the second optical amplifier amplifies the second polarized wave by using second excitation light, and the amplification gain controller controls optical power of the first excitation light and optical power of the second excitation light so as to match peak power of the first optical power value with peak power of the second optical power value.

6. The optical amplification device according to claim 5, wherein the amplification gain controller controls the optical power of the first excitation light and the optical power of the second excitation light so as to match with output peak power of the amplification medium having the smallest gain.

7. An optical amplification method comprising:

a polarization demultiplexing step of separating an optical signal into a first polarized wave and a second polarized wave orthogonal to each other;

a first optical amplification step of amplifying the first polarized wave by using a first amplification medium;

a second optical amplification step of amplifying the second polarized wave by using a second amplification medium;

a first band demultiplexing step of demultiplexing the amplified first polarized wave into a band component of the first polarized wave and a band component of first phase conjugate light generated by the amplification;

a second band demultiplexing step of demultiplexing the amplified second polarized wave into a band component of the second polarized wave and a band component of second phase conjugate light generated by the amplification;

a signal monitoring step of measuring a first optical power value of optical power of either the band component of the first polarized wave or the band component of the first phase conjugate light and a second optical power value of optical power of either the band component of the second polarized wave or the band component of the second phase conjugate light;

an amplification gain control step of controlling an amplification band and gain of the first amplification medium and an amplification band and gain of the second amplification medium on the basis of the first optical power value and the second optical power value; and a polarization multiplexing step of multiplexing the band component of the first polarized wave not measured in the signal monitoring step and the band component of the second polarized wave not measured in the signal monitoring step.

* * * * *